United States Patent [19]
Itonori

[11] Patent Number: 5,313,529
[45] Date of Patent: May 17, 1994

[54] SYSTEM FOR REPRESENTING LINE DRAWINGS BY POLYGONAL LINES

[75] Inventor: Katsuhiko Itonori, Kanagawa, Japan

[73] Assignee: Fuji Xerox Co., Ltd., Tokyo, Japan

[21] Appl. No.: 47,075

[22] Filed: Apr. 16, 1993

Related U.S. Application Data

[63] Continuation of Ser. No. 739,232, Aug. 1, 1991, abandoned.

[30] Foreign Application Priority Data

Aug. 8, 1990 [JP] Japan ................... 2-208118

[51] Int. Cl.$^5$ .............................................. G06K 9/46
[52] U.S. Cl. ....................................... 382/24; 382/23; 395/143
[58] Field of Search ............. 382/21, 23, 24, 26; 395/143, 141; 358/464, 465

[56] References Cited

U.S. PATENT DOCUMENTS

| | | | |
|---|---|---|---|
| 4,163,213 | 7/1979 | Nadler | 382/26 |
| 4,375,654 | 3/1983 | Evans et al. | 382/21 |
| 4,718,103 | 1/1988 | Suojima et al. | 382/21 |
| 4,975,853 | 12/1990 | Shimizu et al. | 382/24 |
| 5,036,544 | 7/1991 | Sakaue et al. | 382/24 |
| 5,064,439 | 11/1991 | Takasaki et al. | 382/24 |

FOREIGN PATENT DOCUMENTS

| | | |
|---|---|---|
| 62-191988 | 8/1987 | Japan . |
| 63-45687 | 2/1988 | Japan . |
| 1-134682 | 5/1989 | Japan . |
| 1-142880 | 6/1989 | Japan . |

*Primary Examiner*—Yon J. Conso
*Attorney, Agent, or Firm*—Finnegan, Henderson, Farabow, Garrett & Dunner

[57] ABSTRACT

A system for representing line drawings by polygonal lines. In the system, a binary digital image is scanned in a main scanning direction to form picture element connection data with a first image picture element as a start point picture element which is scanned next to a first background picture element and with a second background picture element as an end point picture element which is scanned next to a second image picture element, and the relationships between the picture element connection data are detected to provide as picture element block data a group of picture element connection data which have predetermined relationships. Further, it is determined from each picture element block data whether or not the picture element block thereof represents a straight segment, and straight line approximation data is provided according to both the uppermost picture element connection data and the lowermost picture element connection data in the picture element block when it is determined that the picture element block represents a straight segment, whereby parts of the drawing to be represented by polygonal lines are detected and processed with high efficiency.

12 Claims, 5 Drawing Sheets

SYSTEM FOR REPRESENTING LINE DRAWINGS BY POLYGONAL LINES

This application is a continuation of application Ser. No. 07/739,232 filed Aug. 1, 1991 now abandoned.

BACKGROUND OF THE INVENTION

This invention relates to a system for representing line drawings by polygonal lines in which a line drawing is read as binary digital data, and the binary digital data are converted into polygonal line data.

A method of representing a line drawing by polygonal lines is often employed for data compression or data reuse, as is well known in the art. More specifically, the following three methods have been employed for representing line drawings by polygonal lines:

(1) A first method in which a line drawing is represented by a number of thin lines, and the resultant picture elements are traced (cf. Japanese Patent Application Unexamined Publication Nos. Hei. 1-134682 and Hei. 1-142880).

(2) A second method in which the contour lines of an image are extracted, and the center lines of the contour lines thus extracted are obtained.

(3) A third method in which an image is divided into a number of squares arranged in a matrix form, and the local pattern of each square is identified (cf. Japanese Patent Application Unexamined Publication No. Sho. 62-191988).

However, these methods are disadvantageous in that, since it is necessary for each of the methods to employ an image processing technique which accesses an image in its entirety, the image processing time is necessarily long, and it is essential to provide a large capacity memory because the image must be kept in memory during the image processing time.

On the other hand, a method has been employed in which polygonal lines are obtained from run data (cf. Japanese Patent Application Unexamined Publication No. Sho. 63-45687). In the method, straight segments different in inclination are detected from the variation between the gravity center values of the m-th run and the (m-n)-th run. However, the method depends only on the local data called "run" in the image, and therefore it cannot determine whether or not the run can be represented by polygonal lines. For instance, in the case of a solid arrow mark in a drawing, the method cannot detect its configuration from the run data.

SUMMARY OF THE INVENTION

Accordingly, an object of this invention is to eliminate the above-described difficulties accompanying a conventional method of representing line drawings by polygonal lines.

More specifically, an object of the invention is to provide a system for representing line drawings by polygonal lines in which parts to be represented by polygonal lines are detected with high efficiency and only the parts thus detected are processed so as to be represented by polygonal lines; that is, an image processing operation is not required to make access to the whole image.

The foregoing object and other objects of the invention have been achieved by the provision of a system of representing line drawings by polygonal lines according to the invention which comprises: a picture element connection data forming section for scanning a binary digital image in a main scanning direction, to form picture element connection data with a first image picture element as a start point picture element which is scanned next to a first background picture element and with a second background picture element as an end point picture element which is scanned next to a second image picture element; a picture element block data forming section for detecting relationships between the picture element connection data, to provide as picture element block data a group of picture element connection data which have predetermined relationships; a straight segment determining section for determining from each picture element block data whether or not the picture element block thereof represents a straight segment; and a straight line approximating section for providing straight line approximation data according to both the uppermost picture element connection data and the lowermost picture element connection data in the picture element block, when the straight segment determining section determines that the picture element block represents a straight segment.

With the system of the invention, an image is converted into a stacked data structure, and the stacked data structure is utilized to represent the image by polygonal lines. More specifically, picture element connection data, and picture element block data which is a group of picture element connection data are obtained from an image, and those data are utilized to represent the image by polygonal lines.

DETAILED DESCRIPTION OF THE PREFERRED EMBODIMENT

One preferred embodiment of this invention will be described with reference to the accompanying drawings.

Figure 1:
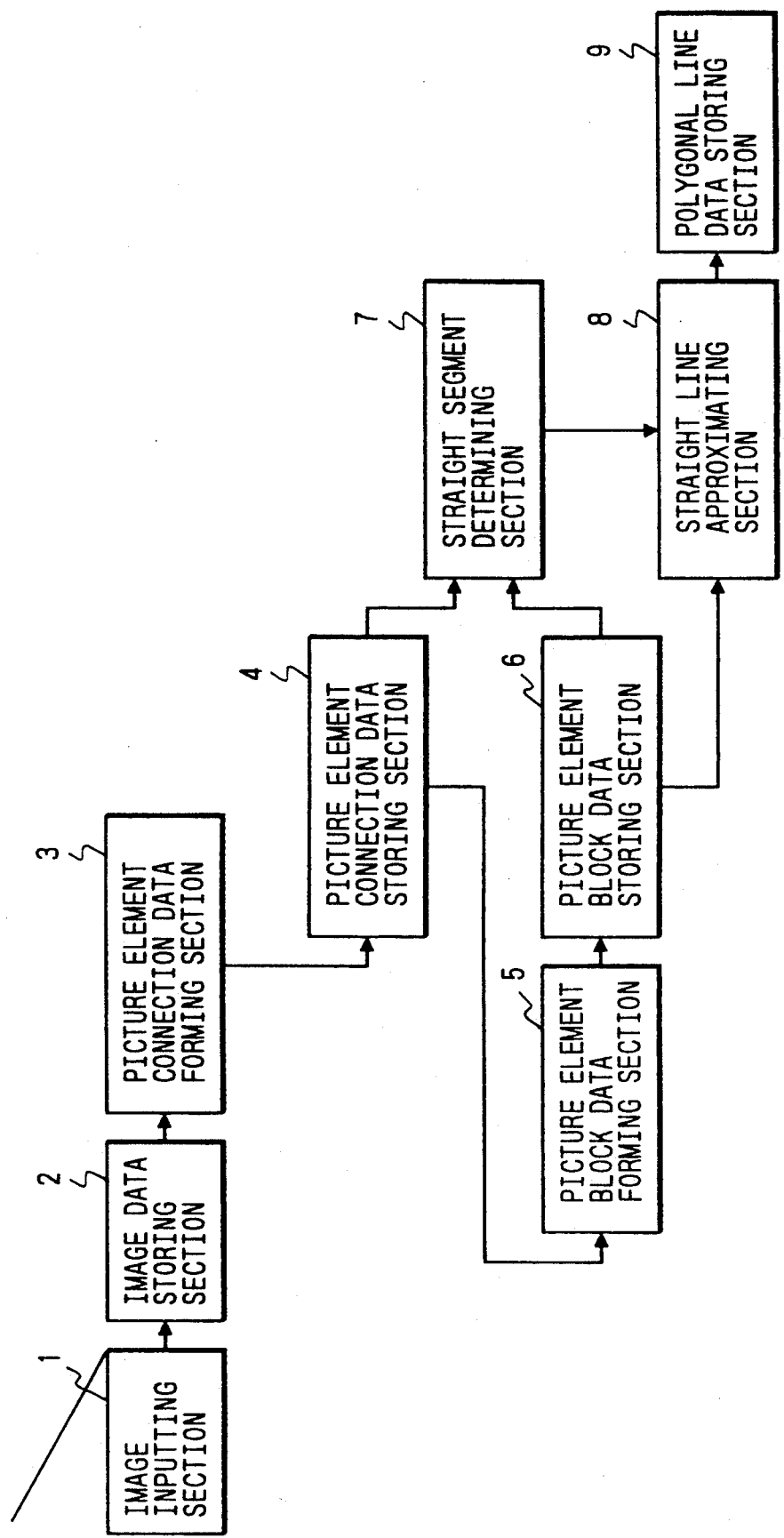
FIG. 1 is a block diagram showing the arrangement of a system of representing line drawings by polygonal lines according to an embodiment of the invention.

A system of representing line drawings by polygonal lines in the embodiment shown in FIG. 1, comprises an image inputting section 1 such as an image scanner for inputting the binary data of an image, an image data storing section 2 for storing image data inputted by the image inputting section 1, a picture element connection data forming section 3 which scans the binary digital image in the main scanning direction which is stored in the image data storing section 2, and forms picture element connection data with a first image picture element (or a black picture element) as a start point picture element which is scanned next to a first background picture element (or a white picture element) and with a second background picture element as an end point picture element which is scanned to a second image picture element. The system also includes a picture element connection data storing section 4 for storing the picture element connection data formed by the picture element connection data forming section 3, a picture element block data forming section 5 which detects picture element connection data adjacent in a vertical direction (or in the auxiliary scanning direction) and provides as picture element block data a group of picture element connection data which have a predetermined relationship, a picture element block data storing section 6 for storing the picture element block data formed by the picture element block data forming section 5, a straight segment determining section 7 for determining from the picture element block data whether or not the picture element block thereof represents a straight segment, a straight line approximating section 8 which, when the straight segment determining section 7 determines that a picture element block represents a straight segment, provides straight line approximation data according to both the data of the start and end points of the uppermost picture element connection data and the data of the start and end points of the lowermost picture element connection data of the picture element block, and a polygonal line data storing section 9 for storing as polygonal line data the data provided by the straight line approximating section 8.

A process of representing a line drawing by polygonal lines (hereinafter referred to as "a polygonal line process", when applicable) will be described with reference to FIG. 1.

The binary digital image data inputted by the image inputting section 1 are stored in the image data storing section 2. The picture element connection data forming section 3 forms the run data of the image; i.e., the picture element connection data from the contents of the image data storing section 2. The picture element block data forming section 5 extracts the picture element block data representing the picture element connection data which are connected to one another vertically in the image.

Figure 4:
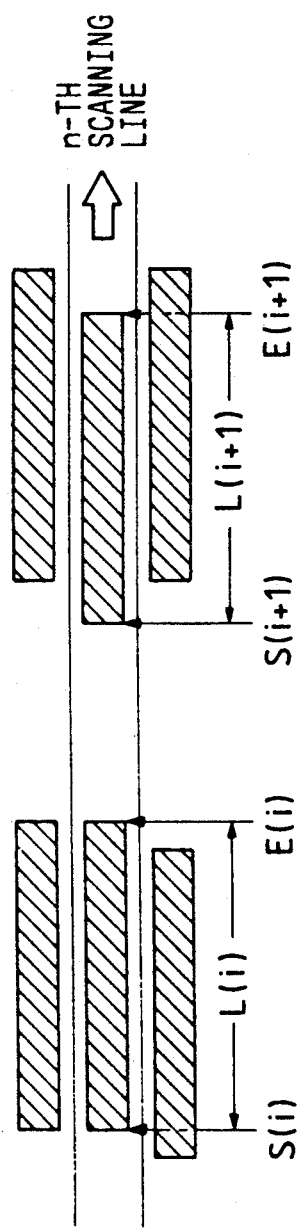
FIG. 4 is an explanatory diagram for a description of picture element connection data in the system.

A picture element connection data extracting procedure will be described with reference to FIG. 2. FIG. 4 shows picture element connection data.

Figure 2:
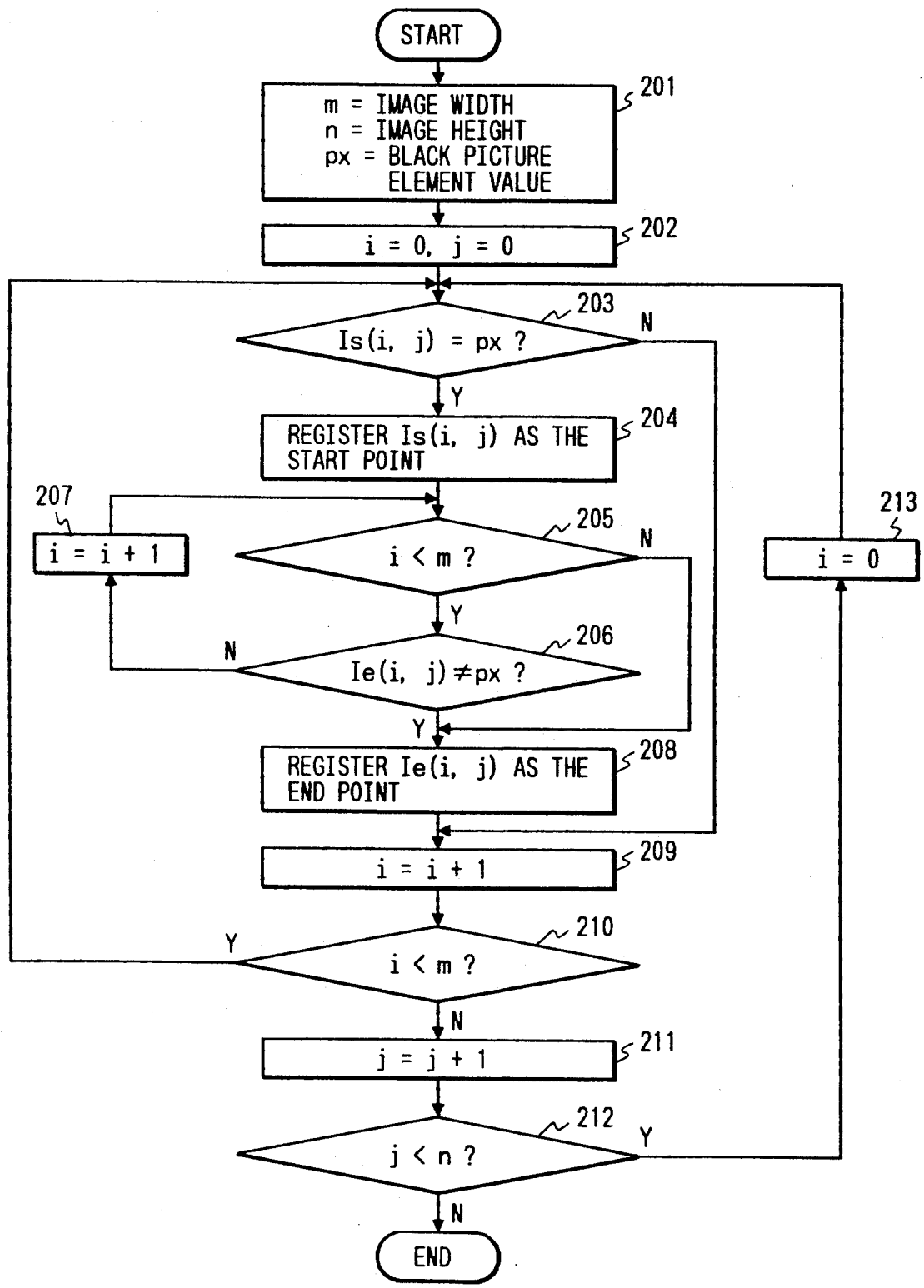
FIG. 2 is a flow chart for a description of the operation of a picture element connection data forming section in the system shown in FIG. 1.

An image is scanned in the raster direction (or in the main scanning direction), to detect a picture element Is (i,j) where the background picture element value of the image changes to the drawing picture element value (Steps 201 through 204 in FIG. 2). More specifically, an image width m, image height n, and black picture element value px are set (Step 201), and a start point is set to (i=0, j=0) for the raster scan (Step 202). It is determined whether or not the picture element Is (i,j) at the scanning position is the black picture element value px (Step 203). When it is the black picture element, then the picture element Is (i,j) is registered as the start point of the picture element connection data (Step 204).

The scanning operation is continued until a picture element Ie (i,j)≠px is detected where the drawing picture element value changes to the background picture element value (Steps 205 through 207). More specifically, it is determined from i<m whether or not the end of one scanning line is reached by the scanning operation (Step 205). When the end of the scanning line is not reached yet, it is determined whether or not the drawing picture element value has changed to the background picture element value (Step 206). When it is determined that the drawing picture element value has not changed yet, the scanning operation is advanced by one picture element (Step 207), and the above-described operations are carried out again. In Step 206, if it is determined that the value of the picture element has changed (Ie (i,j)≠px), then the picture element Ie (i,j) is registered as the end point of the picture element connection data (Step 208). When, in this case, the picture element is not detected where the drawing picture element value changes to the background picture element value until the image is scanned to the right end, it is judged that the connection of picture elements is ended on this scanning line, and the picture element where the drawing picture element value changes to the background picture element value is determined as a picture element Ie (m,j).

After Step 208 is executed, Steps 209 and 210 are executed to complete the scanning operation on the scanning line.

The picture elements are registered as follows: That is, the picture element Is is stored as the start point S(t) of the t-th picture element connection data in the picture element connection data storing section 4, and the picture element Ie is stored as the end point E(t) of the t-th picture element connection data in the section 4. In this operation, the length L(t) of the picture element connection data may be stored as additional data. The abovedescribed operations are carried out until the scanning line goes over the height n of the image (Steps 211 through 213).

Figure 3:
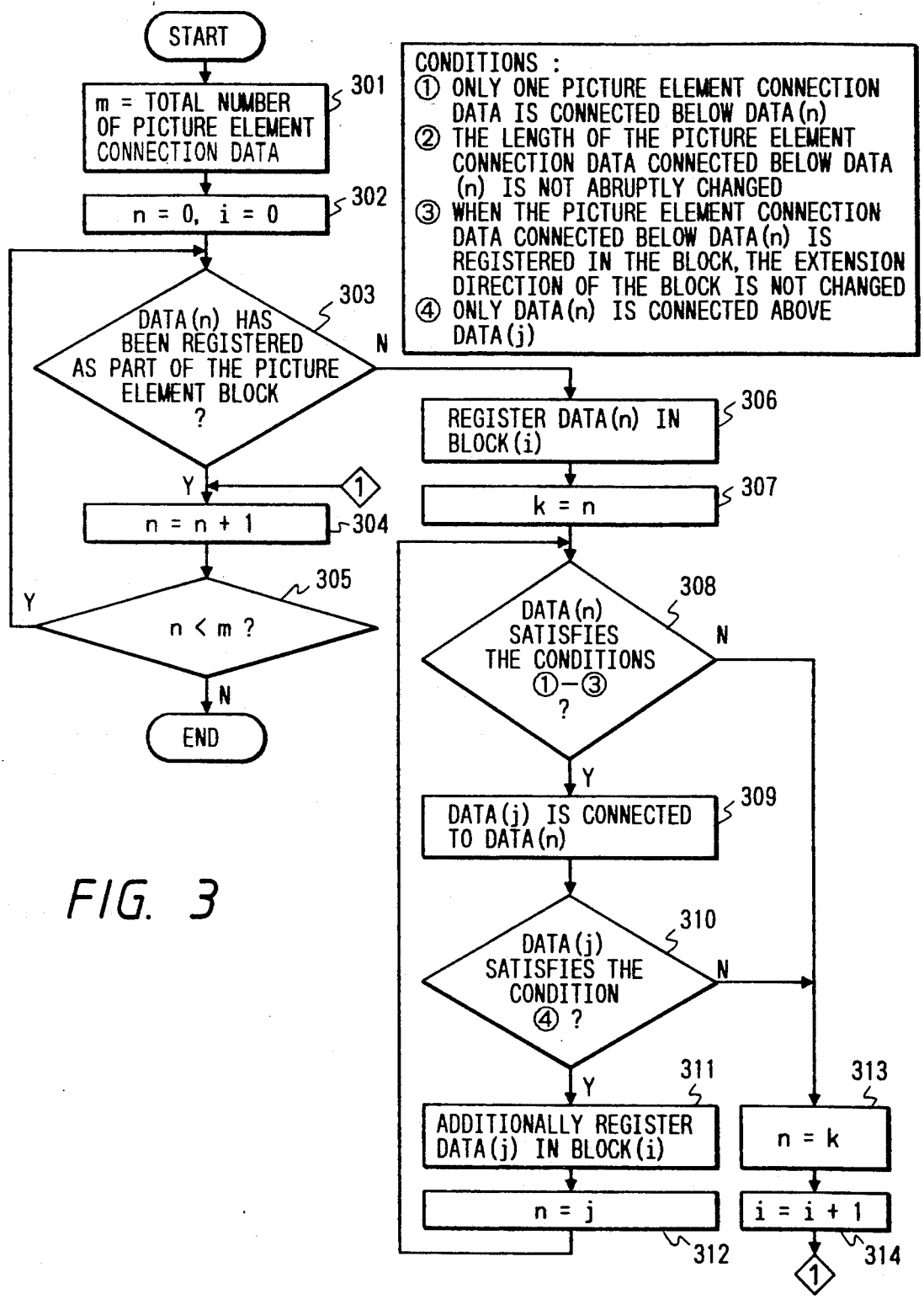
FIG. 3 is also a flow chart for a description of the operation of a picture element block data forming section in the system shown in FIG. 1.

Next, the picture element connection data thus extracted and the image are utilized to extract picture element block data. This will be described with reference to FIG. 3, a flow chart.

First, the total number of picture element connection data is set to m (Step 301), and the picture element connection data number n is set to 0 (n=0), and the picture element block data number i is also set to 0 (i=0) (Step 302).

The n-th picture element connection data DATA(N) is read out of the picture element connection data storing section 4, and it is determined whether or not the data thus read out has been registered as part of the picture element block (Step 303). When it is determined that the data has been stored as part of the picture element block, the value n is increased by one (1) (n=n+1) in order to read the next picture element connection data (Step 304). Thereafter, it is determined whether or not n is smaller than m, so as to determine whether or not the picture element block formation has been accomplished for all the picture element connection data (Step 305).

When, in Step 303, it is determined that the data has not been registered as part of the block, formation of new picture element block data is carried out (Steps 306 through 314).

The formation of new picture element block data will be described in detail.

In the case where the picture element connection data DATA(n) has not been registered as part of the picture element block, it is registered in picture element block data BLOCK(i) (Step 306)., The value of the variable n is temporarily saved for later use (Step 307).

Thereafter, it is determined whether or not the picture element connection data DATA(N) satisfies the following three conditions (Step 308):

Condition (1)—Only one picture element connection data is connected below the data DATA(n).

Condition (2)—The length of the picture element connection data connected below the data DATA(N) is not abruptly changed. For instance, the length is not increased twice as large, nor reduced to half.

Condition (3)—When the picture element connection data connected below the data DATA(n) is registered in the block, the direction of extension of the block is not changed.

The term "direction of extension" as described in condition (3) is intended to mean the direction of variation (increase or decrease) in position between the i-th picture element connection data $DATA_u(i)$ from the top in a block and the $(i+1)$-th picture element connection data $DATA_u(i+1)$. More specifically, condition (3) means that the sign of the difference $[a_i=DATA_u(i+1)-DATA_u(i)]$ between the x-coordinate of the middle point of picture element connection data $DATA_u(i)$ and the x-coordinate of picture element connection data $DATA_u(i+1)$ in a block is coincident with the sign of the difference $[a_{i+1}=DATA_u(i+2)-DATA_u(i+1)]$ between the x-coordinate of the middle point of picture element connection data $DATA_u(i)$ and the x-coordinate of picture element connection data $DATA_u(i+1)$ which is obtained when new picture element connection data $DATA_u(i+2)$ is added to the block.

When the picture element connection data DATA(n) satisfies none of the conditions (1), (2) and (3), it is determined that the picture element block data BLOCK(n) has been ended.

When the picture element connection data DATA(n) satisfies the conditions (1), (2) and (3), the picture element connection data storing section 4 is searched for picture element connection data DATA(j) which is connected to the data DATA(n) (Step 309).

Next, it is determined whether or not the picture element connection data DATA(j) satisfies the following condition (4):

Condition 4—Only the picture element connection data DATA(n) is connected above the picture element connection data DATA(j).

When the picture element connection data DATA(j) satisfies the condition (4), it is additionally registered in the picture block data BLOCK(i) (Step 311). Then, in order to search for picture element connection data to be connected to the picture element connection data DATA(j) thus registered, the variable n is set to j (Step 312), and Step 308 is effected again.

The above-described operations are carried out successively until the picture block data BLOCK(i) is ended. When in Step 308 the conditions (1) through (3) are not satisfied, or in Step 310 the condition (4) is not satisfied, it is determined that the picture element block data BLOCK(i) has been ended, and Step 304 is effected. In this case, the variable n is set to the value saved in Step 307 (Step 313) and the variable i is increased by one (Step 314).

Thereafter, the picture element connection data storing section 4 is searched for picture element connection data which is not registered as picture element block data. Further, the above-described operations are performed successively until all the picture element connection data have been registered as picture element block data.

It has been described that the picture element block data actually includes all the picture element connection data. However, in practice, the picture element block data is represented typically by the circumscribed rectangle of the region which the block occupies in the image, and the picture element connection data contained in the block record only the positions in the picture element connection data storing section 4.

Figure 5:
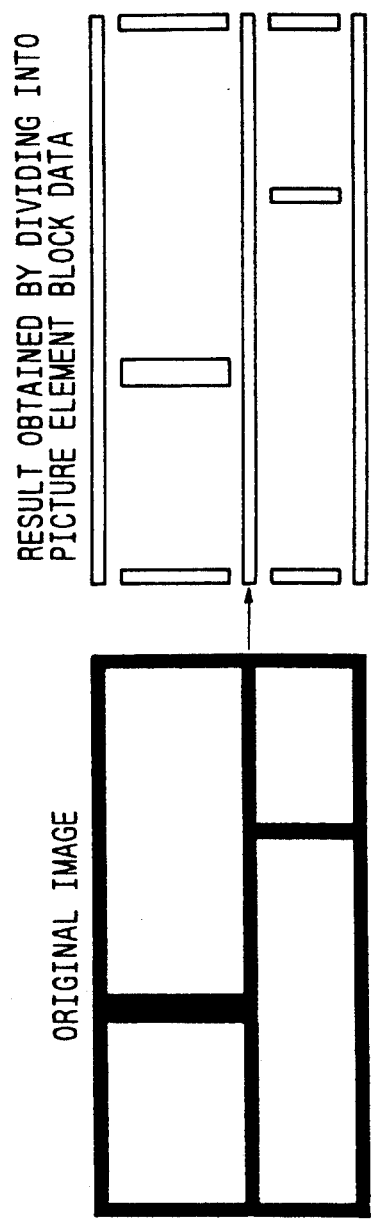
FIG. 5 is an explanatory diagram for a description of picture element block data in the system.
Figure 6:
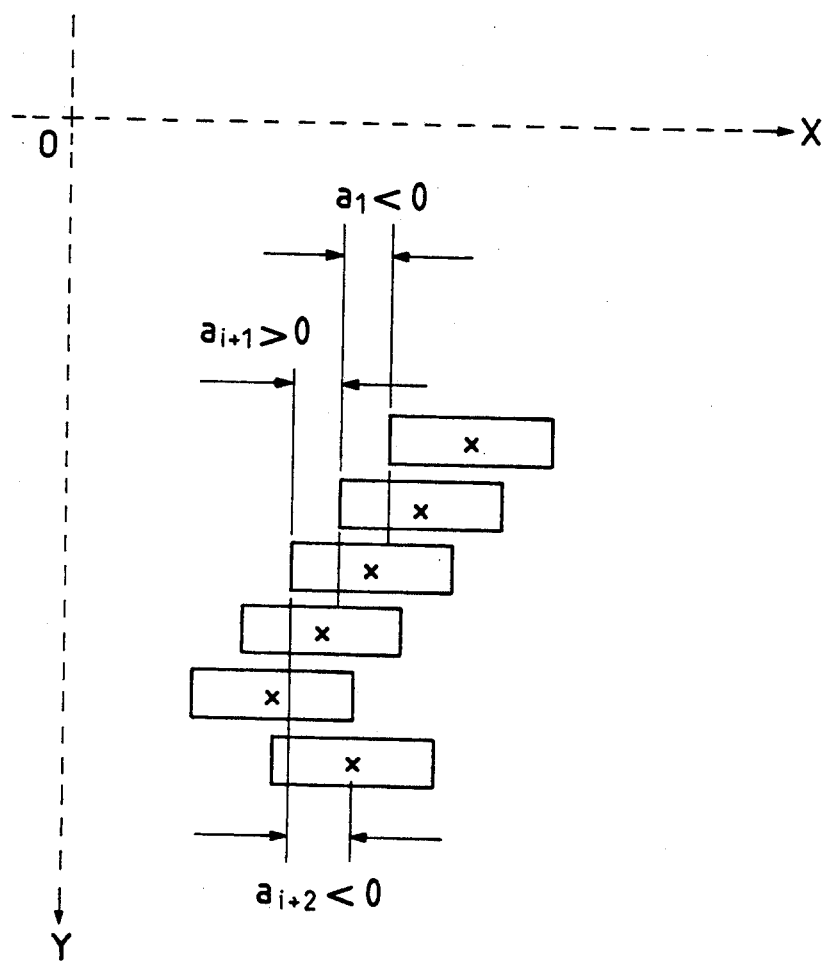
FIG. 6 is an explanatory diagram for a description of the direction of extension of picture element block data.

One example of an image which is represented by picture element block data is as shown in FIG. 5.

Referring back to FIG. 1, the straight segment determining section 7 operates to determine whether or not each block represents a straight segment in an image. This operation is to prevent the application of the polygonal line process to solid parts of a drawing such as solid arrow marks or round marks, because the polygonal line process should be applied to parts of a drawing which are represented by straight lines.

The straight segment determining section 7 reads the lengths of all the picture element connection data in each block, so that,, when a block includes a number of picture element connection data equal in length, the block is determined as a straight segment. Furthermore, the section 7 detects the dimensions of the circumscribed rectangle of the block, so that, when the value which is obtained by dividing its width by its height is larger than a predetermined value, the block is determined as a horizontal line. This data is outputted additionally.

The straight line approximating section 8 operates to read out of the picture element block data storing section 6 the picture element block data which has been determined as a straight segment by the straight segment determining section 7. In the case where the block has been determined as a vertical line by the straight segment determining section 7, the straight line approximating section 8 obtains as straight line approximation data the middle points of the uppermost picture element connection data and the lowermost picture element data in the picture element block. In the case where, on the other hand, the block has been determined as a horizontal line by the straight segment determining section 7, the straight line approximating section 8 obtains as straight line approximation data the right and left end points in the block. The straight line approximation data obtained from the blocks are stored, as polygonal line data representing the binary digital image, in the polygonal line data storing section 9.

Thus, the polygonal line process has been accomplished.

In the above-described embodiment, the direction of extension of picture element block data is the direction in which the x-coordinates of the middle points of the picture element connection data change. However, the same picture element block data can be obtained by the following method: First, picture element block data are formed irrespective of the condition (3), and then each block is divided into subblocks. In each of the subblocks, a segment is formed which connects the middle point of the uppermost picture element data to the middle point of the lowermost picture element data in the sub-block. The direction of the segment thus formed is detected, and the block is divided at the point where the direction of the segment changes more than a predetermined threshold value.

As was described above, in the system of the invention, an image is converted into a stacked data structure, and the polygonal line process is carried out by utilizing the stacked data structure. Therefore, in the polygonal line process, it is unnecessary to perform the image processing operation which takes time, and accordingly the polygonal line data can be obtained quickly.

Furthermore, in the system of the invention, the picture element connection data representing the run data of an image are utilized to obtain the picture element block data in which the picture element connection data are connected vertically. Therefore, each of the block data represent a segment, so that polygonal data can be obtained with high accuracy.

The picture element block data includes the picture element connection data. Hence, the arrangement of data in each block can be detected by measuring the lengths of the picture element connection data, and therefore polygonal data can be provided only for part of the drawing.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A system for representing line drawings by polygonal lines comprising:
   picture element connection data forming means for scanning a binary digital image in a main scanning direction to form sets of picture element connection data, each set having a start point picture element where a background picture element value of the image changes to a drawing picture element value and having an end point picture element where the drawing picture element value changes to the background picture element value, said start point picture element and said end point picture element of each set of picture element connection data lying in one scanning line in the main scanning direction;
   picture element block data forming means for detecting relationships between sets of picture element connection data which are adjacent in a direction perpendicular to said main scanning direction and for forming picture element block data from sets of picture element connection data having predetermined relationships;
   straight segment determining means for determining from each picture element block data whether or not the picture element block thereof represents a straight segment; and
   straight line approximating means for providing straight line approximation data according to both the uppermost element connection data and the lowermost picture element connection data in said picture element block in response to a determination by said straight segment determining means that said picture element block represents a straight segment.

2. A system according to claim 1, wherein said straight segment determining means determines whether said picture element block represents a vertical or horizontal line.

3. A system according to claim 2, wherein said straight line approximating means obtains as the straight line approximation data the middle points of the uppermost picture element connection data and the lowermost picture element connection data in response to a determination by said straight segment determining means that said picture element block represents a vertical line.

4. A system according to claim 2, wherein said straight line approximating means obtains as the straight line approximation data the right and left end points in said picture element block in response to a determination by said straight segment determining means that said picture element block represents a horizontal line.

5. A system according to claim 1, further comprising image data storing means for storing said binary digital image to be scanned by said picture element connection data forming means.

6. A system according to claim 1, further comprising picture element connection data storing means for storing the picture element connection data formed by said picture element connection data forming means, and picture element block data storing means for storing the picture element block data formed by said picture element block data forming means.

7. A method for representing line drawings by polygonal lines comprising:
   scanning a binary digital image in a main scanning direction to form sets of picture element connection data by detecting a start point picture element where the background picture element value of the image changes to the drawing picture element value and by detecting an end point picture element where the drawing picture element value changes to the background picture element value, said start point picture element and said end point picture element of each set of picture element connection data lying in one scanning line in the main scanning direction;
   forming picture element block data by detecting relationships between sets of picture element connection data which are adjacent in a direction perpendicular to said main scanning direction and by forming picture element blocks from said sets of picture element connection data having predetermined relationships;
   determining from each picture element block data whether or not the picture element block represents a straight segment; and
   providing straight line approximation data according to both the uppermost picture element connection data and the lowermost picture element connection data in said picture element block in response to a determination in said determining step that said picture element block represents a straight segment.

8. A method according to claim 7, wherein said determining step includes determining whether said picture element block represents a vertical or horizontal line.

9. A method according to claim 8, wherein said providing step obtains middle points of an uppermost picture element connection data and a lowermost picture element connection data as the straight line approximation data in response to a determination in said determining step that said picture element block represents a vertical line.

10. A method according to claim 8, wherein said providing step obtains a right end point and a left end point as the straight line approximation data in response to a determination in said determining step that said picture element block represents a horizontal line.

11. A method according to claim 7, further comprising storing said binary digital image to be scanned in said scanning step.

12. A method according to claim 7, further comprising storing said picture element connection data formed in said scanning step and storing said picture element block data formed in said forming step.

* * * * *